US012434522B2

(12) United States Patent
Kurihara

(10) Patent No.: US 12,434,522 B2
(45) Date of Patent: Oct. 7, 2025

(54) SPRING GUIDE AND SUSPENSION DEVICE

(71) Applicant: KYB Corporation, Tokyo (JP)

(72) Inventor: Kenta Kurihara, Aichi (JP)

(73) Assignee: KYB CORPORATION, Tokyo (JP)

( * ) Notice: Subject to any disclaimer, the term of this patent is extended or adjusted under 35 U.S.C. 154(b) by 400 days.

(21) Appl. No.: 17/760,351

(22) PCT Filed: Jan. 27, 2021

(86) PCT No.: PCT/JP2021/002779
§ 371 (c)(1),
(2) Date: Aug. 8, 2022

(87) PCT Pub. No.: WO2021/161784
PCT Pub. Date: Aug. 19, 2021

(65) Prior Publication Data
US 2023/0067151 A1    Mar. 2, 2023

(30) Foreign Application Priority Data
Feb. 10, 2020  (JP) ................. 2020-020839

(51) Int. Cl.
*B60G 15/06*    (2006.01)
(52) U.S. Cl.
CPC ...... *B60G 15/063* (2013.01); *B60G 2202/312* (2013.01); *B60G 2204/1242* (2013.01); *B60G 2204/128* (2013.01); *B60G 2800/162* (2013.01)
(58) Field of Classification Search
CPC .... F16F 9/3207; F16F 1/126; F16F 2224/025; B60G 15/063; B60G 2204/124; B60G 2202/312; B60G 2204/1242; B60G 2204/128; B60G 2800/162; B60G 11/16; B60G 2206/014
See application file for complete search history.

(56) References Cited

U.S. PATENT DOCUMENTS

| | | |
|---|---|---|
| 2016/0023529 A1 | 1/2016 | Wilkin |
| 2016/0185177 A1 | 6/2016 | Kaneko et al. |
| 2018/0126816 A1 | 5/2018 | Kondo et al. |
| 2022/0213943 A1 * | 7/2022 | Kurihara ............... B60G 11/16 |

FOREIGN PATENT DOCUMENTS

| | | |
|---|---|---|
| CN | 105518335 A | 4/2016 |
| DE | 102010028290 A1 | 11/2011 |
| JP | S61-57011 U | 4/1986 |
| JP | H11-294511 A | 10/1999 |
| JP | 2002130351 A | 5/2002 |
| JP | 2007198406 A | 8/2007 |
| JP | 2015-052355 A | 3/2015 |
| JP | 2018-071756 A | 5/2018 |

OTHER PUBLICATIONS

Japanese Patent No. JP 2001248674 to Enomoto et al published on Sep. 14, 2001.*

* cited by examiner

*Primary Examiner* — Pamela Rodriguez
(74) *Attorney, Agent, or Firm* — Rabin & Berdo, P.C.

(57) ABSTRACT

A spring guide includes: a main body portion of which a coil spring is placed on a vehicle side, the main body portion being formed of a resin material; and a covering portion that covers an anti-spring side of the main body portion opposite to the coil spring. The covering portion is formed of a material having a physical property different from that of the resin material forming the main body portion.

9 Claims, 7 Drawing Sheets

SPRING GUIDE AND SUSPENSION DEVICE

TECHNICAL FIELD

The present invention relates to a spring guide and a suspension device.

BACKGROUND ART

JP2015-52355A discloses a suspension device including a cylinder, a coil spring attached to an outer periphery of the cylinder, and a spring seat that supports a lower end portion of the coil spring.

SUMMARY OF INVENTION

In the suspension device as disclosed in JP2015-52355A, since a spring guide is formed of a resin material, the strength of the spring guide may decrease due to disturbances such as stepping stones and water.

The object of the present invention is to improve the durability of the spring guide in the suspension device.

According to an aspect of the present invention, a spring guide includes: a main body portion on which the coil spring is placed, the main body portion being formed of a resin material; and a covering portion that covers an anti-spring side of the main body portion opposite to the coil spring. The covering portion is formed of a material having a physical property different from that of the resin material forming the main body portion.

DESCRIPTION OF EMBODIMENTS

A suspension device 10 according to an embodiment of the present invention will be described with reference to the drawings. The suspension device 10 is a device for stably suspending a vehicle body by being mounted on an automobile (not illustrated), by positioning a wheel (not illustrated), and by absorbing impacts and vibrations received from a road surface during a travelling of a vehicle by generating a damping force.

Figure 1:
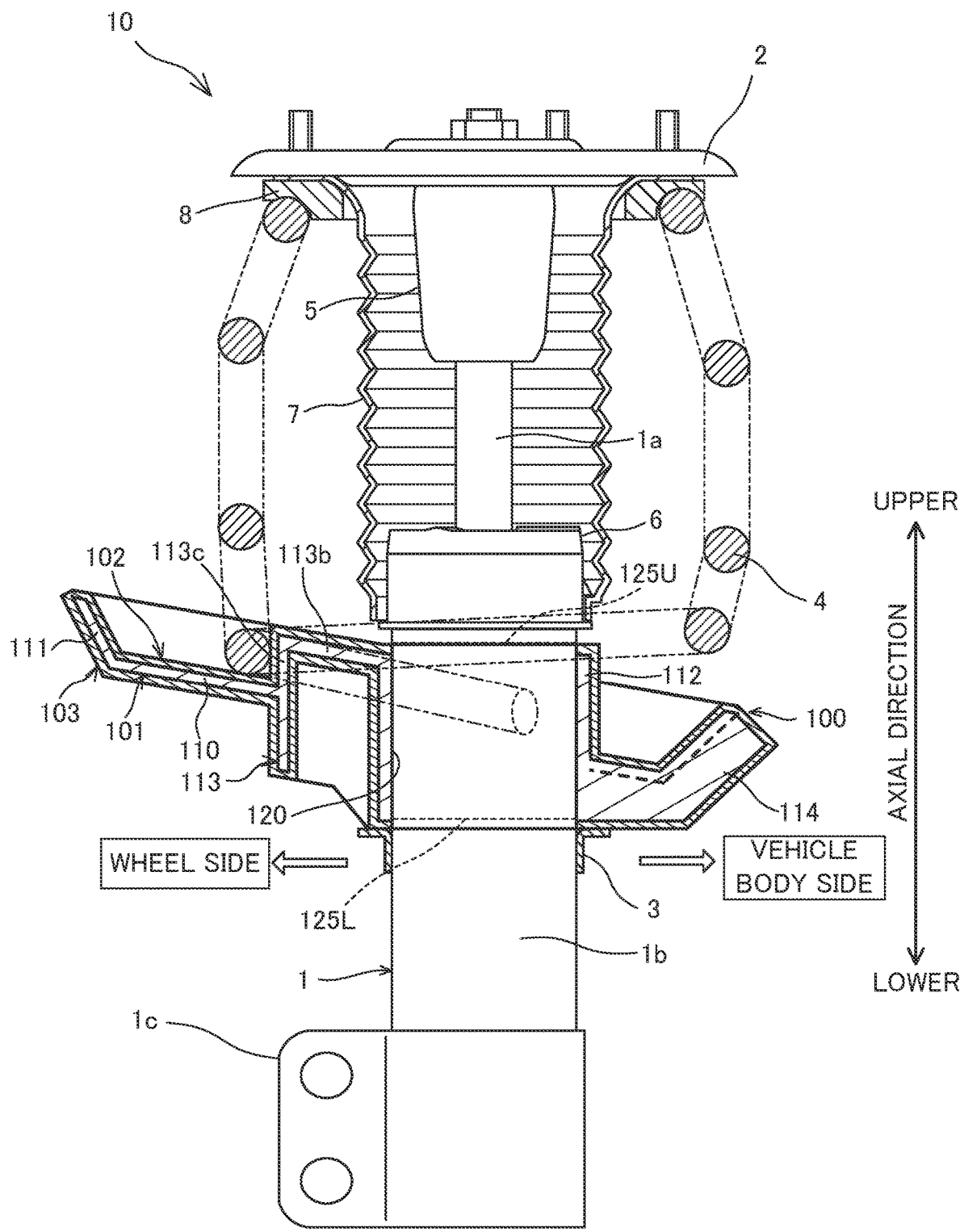
FIG. 1 is a partial cross-sectional view of a suspension device according to an embodiment of the present invention.

As shown in FIG. 1, the suspension device 10 includes: a shock absorber 1 that is provided between the vehicle body and the wheel; an upper mount 2 that is attached to a tip end of a piston rod (hereinafter, referred to as a rod) 1a of the shock absorber 1; a spring guide 100 that is attached to an outer periphery of a cylinder 1b of the shock absorber 1; a coil spring 4 that is provided between the spring guide 100 and the upper mount 2 and elastically supports the vehicle body; a bump cushion 5 that is fitted to the rod 1a and restricts a stroke of the shock absorber 1 in a contracting direction; a bump stopper 6 that is fitted to an end portion of the cylinder 1b on the side of the rod 1a; and a tubular dust boot 7 that protects the rod 1a.

The shock absorber 1 has the cylinder 1b and the cylindrical rod 1a protruding from an opening portion of the cylinder 1b. The shock absorber 1 is a twin-tube shock absorber, and the cylinder 1b has a bottomed cylindrical outer tube that constitutes an outer shell of the cylinder 1b, and an inner tube (not illustrated) provided inside the outer tube. A piston (not illustrated) that divides the inside of the inner tube (not illustrated) into an extension side chamber and a compression side chamber is connected to a lower end portion of the rod 1a.

A bracket 1c for linking a hub carrier (not illustrated) that holds the wheel and the shock absorber 1 is provided on an end portion of the cylinder 1b on the opposite side from the rod 1a side. For the sake of convenience of description, the vertical direction is defined as shown in FIG. 1, in which the upper mount 2 side corresponds to the upper side of the suspension device 10 and the bracket 1c side corresponds to the lower side of the suspension device 10. Further, the vertical direction of the suspension device 10 corresponds to the axial direction (the center axial direction) of the suspension device 10, that is, the extension-contraction direction of the shock absorber 1. In addition, the radial direction of the suspension device 10 (the radial direction of the shock absorber 1) intersects with the axial direction of the suspension device 10 perpendicularly.

The shock absorber 1 is assembled to the vehicle by being linked to the vehicle body via the upper mount 2 and by being linked to the hub carrier with the bracket 1c. The shock absorber 1 configured as described above is configured so as to generate a damping force when the rod 1a is moved with respect to the cylinder 1b in the axial direction (the vertical direction in FIG. 1). The suspension device 10 quickly damps vibrations of the vehicle body by the damping force generated by the shock absorber 1.

The coil spring 4 is provided between the spring guide 100 and the upper mount 2. The coil spring 4 is clamped and compressed by the upper mount 2 and the spring guide 100, thereby biasing the shock absorber 1 in the extending direction.

A rubber seat 8 is provided between the upper mount 2 and an upper end portion of the coil spring 4. This prevents direct contact between the upper mount 2 and the coil spring 4. An elastic portion 102, which will be described later, is provided between a main body portion 101 of the spring guide 100 and a lower end portion of the coil spring 4. This prevents direct contact between the main body portion 101 of the spring guide 100 and the coil spring 4.

As shown in FIG. 1, the spring guide 100 is attached to the outer periphery of the cylinder 1b and supports the coil spring 4 from below.

The spring guide 100 has the main body portion 101 made of resin material, the elastic portion 102 serving as a support portion integrally molded on an upper surface of the main body portion 101, and a covering portion 103 that is integrally molded on a lower surface of the main body portion 101 to cover the lower surface. Hereinafter, the upper surface side (the upper side in FIGS. 1 and 4) of the main body portion 101 on which the coil spring 4 is placed is also referred to as the "spring side" of the main body portion 101, and the opposite lower surface side of the main body portion 101 as the "anti-spring side" of the main body portion 101. The anti-spring side of the main body portion 101 faces the ground when the suspension device 10 is attached to a vehicle. That is, the elastic portion 102 is provided on the spring side of the main body portion 101, and the covering portion 103 is provided on the anti-spring side of the main body portion 101.

Figure 2:
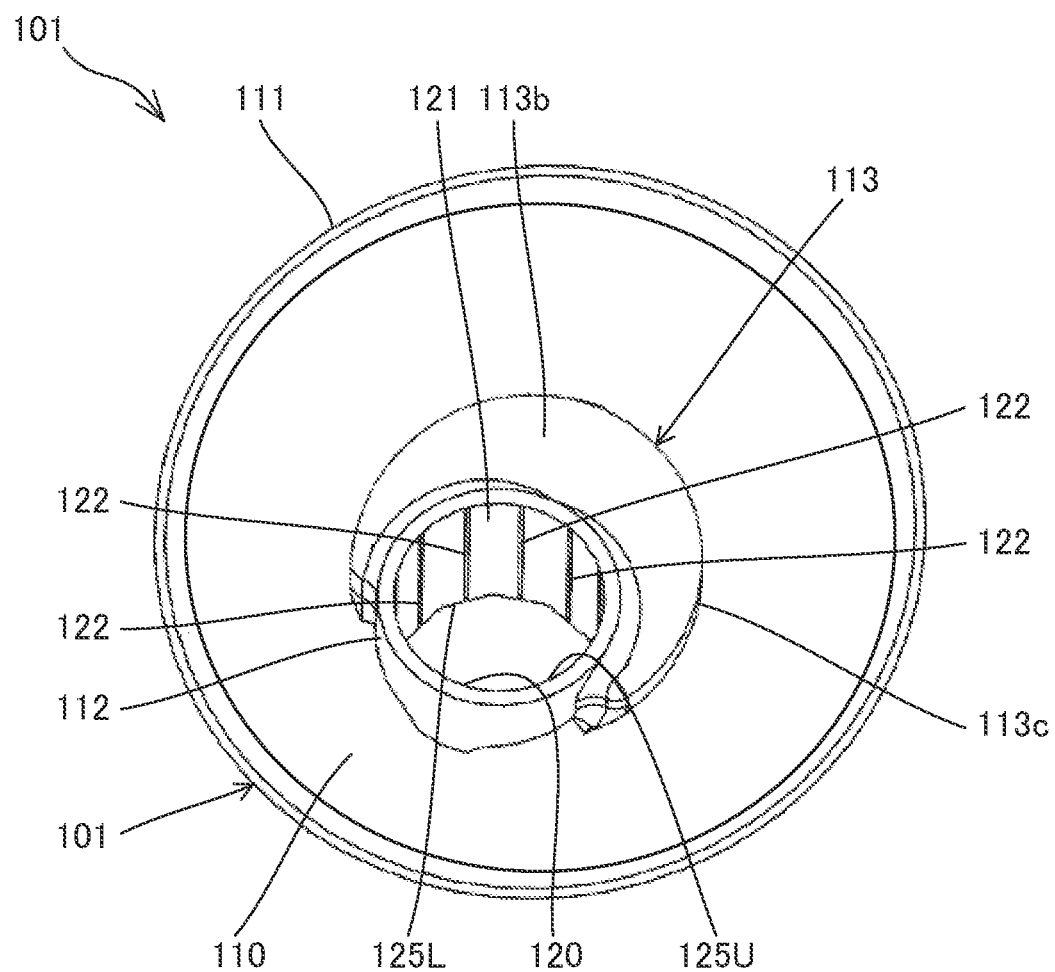
FIG. 2 is a perspective view of a main body portion of a spring guide according to the embodiment of the present invention as viewed from an upper surface side.
Figure 3:
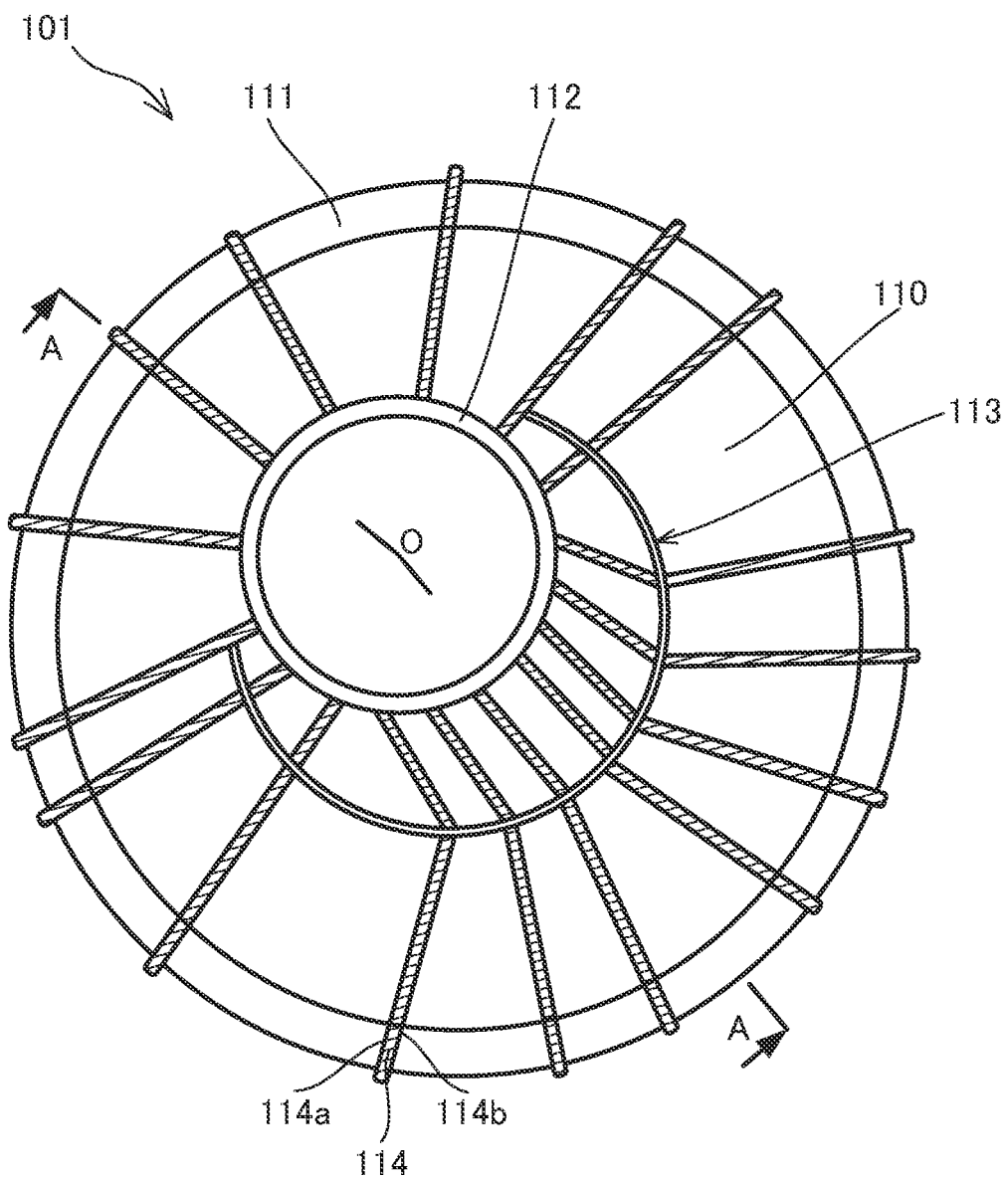
FIG. 3 is a plan view of the main body portion of the spring guide according to the embodiment of the present invention as viewed from a lower surface side.
Figure 4:
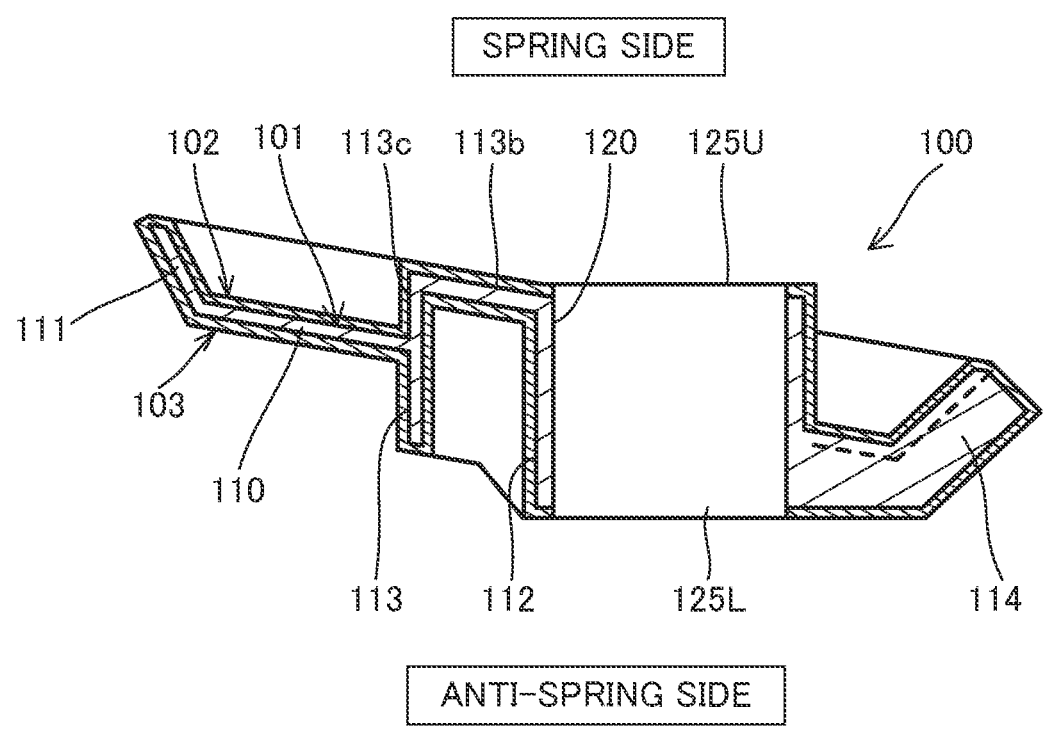
FIG. 4 is a cross-sectional view taken along a line A-O-A in FIG. 3.

FIG. 2 is a perspective view of the main body portion 101 as viewed from the upper surface side (the spring side), FIG. 3 is a plan view of the main body portion 101 as viewed from the lower surface side (the anti-spring side), and FIG. 4 is a cross-sectional view of the spring guide 100 along the A-O-A line in FIG. 3. As shown in FIGS. 2-4, the main body portion 101 of the spring guide 100 includes: a disc-shaped base portion 110 on which the lower end portion of the coil spring 4 is placed, a cylindrical tube portion 112 projecting upwards and downwards from the base portion 110, a side wall 111 extending diagonally upward from a radial outer end portion of the base portion 110, a hub 113 that is provided on an outer peripheral side of the tube portion 112, and a plurality of ribs 114 projecting from the lower surface of the main body portion 101 (see FIG. 3). The side wall 111 has an annular shape, and as shown in FIG. 4, the side wall 111 is inclined so that the inner diameter of the spring guide 100 increases toward the upper side from the base portion 110.

The tube portion 112 has an insertion hole 120 that penetrates the suspension device 10 in the axial direction (vertical direction), and the cylinder 1b of the shock absorber 1 is inserted through the insertion hole 120. As shown in FIG. 1, the insertion hole 120 is formed at a position eccentric from the center of the spring guide 100 toward the vehicle body side when the spring guide 100 is attached to the outer periphery of the cylinder 1b.

As shown in FIG. 2, the insertion hole 120 is provided with a plurality of convex portions 122 projecting radially inward from the inner circumferential surface 121 thereof. The convex portions 122 support the outer circumferential surface of the cylinder 1b of the shock absorber 1. Each convex portion 122 is provided linearly along the axial direction of the insertion hole 120 (that is, the axial direction of the suspension device 10). Moreover, in the drawings excluding FIG. 2, illustration of the convex portions 122 is omitted.

The convex portions 122 are, for example, formed such that the cross-sectional shape thereof is a rounded trapezoid shape or a semicircular shape, and the convex portions 122 come into line contact with the outer circumferential surface of the cylinder 1b. A plurality of the convex portions 122 are arranged at equal intervals along the circumferential direction of the insertion hole 120. Therefore, the spring guide 100 is positioned such that the center axis of the insertion hole 120 aligns with the center axis of the cylinder 1b.

As shown in FIG. 1, a metal support ring 3 is fixed to the outer circumferential surface of the cylinder 1b by welding. The support ring 3 is a support member that supports the spring guide 100. The spring guide 100 is attached to the outer periphery of the cylinder 1b by fitting the insertion hole 120 to the outer periphery of the cylinder 1b and supporting the lower end portion of the tube portion 112 of the spring guide 100 by the support ring 3.

The spring guide 100 is attached to the cylinder 1b by fitting the spring guide 100 to the cylinder 1b from above so as to come into contact with the support ring 3. In other words, the cylinder 1b is inserted from a lower opening end 125L of the insertion hole 120 of the spring guide 100. That is to say, the lower opening end 125L is an entrance through which the cylinder 1b is inserted, and an upper end portion of the cylinder 1b projects out from an upper opening end 125U that is an opening end on the opposite side of the lower opening end 125L.

The hub 113 projects upward from the base portion 110 inside the coil spring 4, as shown in FIGS. 1 and 2. The hub 113 has a bottomed cylindrical shape with the upper portion 113b being the bottom portion, and has an opening portion at the lower portion (see FIG. 1). The outer periphery of the barrel portion 113c of the hub 113 abuts on the inner periphery of the lower end portion of the coil spring 4 and defines the radial position of the coil spring 4. In other words, the hub 113 functions as a position-defining portion that defines the position of the lower end portion of the coil spring 4. The hub 113 holds the lower end portion of the coil spring 4 and thus prevents the coil spring 4 from tilting (falling over).

The plurality of ribs 114 is provided substantially radially from the tube portion 112 or the hub 113 in a manner of extending radially, as shown in FIG. 3. That is, the plurality of ribs 114 is also provided inside the barrel portion 113c of the hub 113 (see FIGS. 1 and 4). By providing the plurality of ribs 114 on the lower surface (anti-spring side) of the main body portion 101, the main body portion 101 is reinforced and the durability (rigidity) of the spring guide 100 is improved. Further, the number, shape, and arrangement of the ribs 114 are not limited to the form shown in FIG. 3. Moreover, in FIG. 3, the hatched portions are the ribs 114, and the illustration is omitted for a part of the ribs 114. Further, the two-dot chain lines in FIG. 1, FIG. 4, and in FIG. 6 and FIG. 7 which will be described later, schematically represent the boundary portions between the ribs 114 and the base portion 110.

The elastic portion 102 and the covering portion 103 are each formed of a material having physical properties different from those of the resin material of the main body portion 101. Specifically, the elastic portion 102 and the covering portion 103 are each integrally molded on the main body portion 101 made of resin through a thermoplastic elastomer, which has a lower elastic modulus than the resin material of the main body portion 101. That is, in this embodiment, the elastic portion 102 and the covering portion 103 are formed of the same material. Examples of the thermoplastic elastomer include a polyester elastomer, a polyurethane elastomer, a polyolefin elastomer, a silicone elastomer, etc.

As shown in FIG. 4, the elastic portion 102 is formed in a manner of covering the entire upper surface of the base portion 110 and the entire upper surface (inner side surface) of the side wall 111. The elastic portion 102 has a uniform thickness. Further, the thickness of the elastic portion 102 is not limited uniformly, and the thickness may differ depending on the site thereof.

A load corresponding to the weight of the vehicle body acts on the base portion 110 of the main body portion 101 on which the coil spring 4 is placed. By integrally molding the elastic portion 102 on the base portion 110, the decrease in strength due to the disturbance of water or the like is suppressed in the base portion 110 on which the load corresponding to the weight of the vehicle body acts. Further, it is desirable that the elastic portion 102 covers an abutting portion on the upper surface of the main body portion 101 on which the coil spring 4 abuts and the entire region radially inward from the abutting portion on the upper surface of the main body portion 101. Similarly, it is desirable that the covering portion covers the lower surface of the main body portion 101 in the entire region facing the coil spring 4 and the radial inner space of the coil spring 4 across the main body portion 101 (and the elastic portion 102). According to these configurations, it is possible to eliminate the influence of disturbance such as water on the main body portion 101 in the region supporting the load according to the weight of the vehicle body, and it is possible to suppress the decrease in the strength of the main body portion 101. Further, in this embodiment, the elastic portion 102 and the covering portion 103 are integrally molded, but the elastic portion 102 may be integrally formed with the main body portion 101 and may be formed separately (separated) from the covering portion 103.

Further, in this description, "the coil spring 4 is placed on the base portion 110 of the main body portion 101" means including not only the case where the lower end of the coil spring 4 comes into direct contact with the base portion 110 but also the case where the lower end of the coil spring 4 comes into contact with the elastic portion 102 provided on the base portion 110 as in this embodiment. In other words, "the coil spring 4 is placed on the base portion 110 of the main body portion 101" means including both the case where the coil spring 4 is placed directly on the base portion 110 of the main body portion 101 and the case where the coil spring 4 is indirectly placed on the base portion 110 of the main body portion 101 via the elastic portion 102 (support portion).

Further, the elastic portion 102 is formed over the entire upper surface of the base portion 110 and the entire upper surface (inner side surface) of the side wall 111. Therefore, when the coil spring 4 breaks (fractures), even if the broken portion of the coil spring 4 falls on the upper surface of the base portion 110 and the upper surface of the side wall 111, the impact from the broken portion can be absorbed by the elastic portion 102. This distributes the load acting on the main body portion 101 of the spring guide 100. As a result, damage to the base portion 110 and the side wall 111 of the spring guide 100 can be effectively prevented. Further, the broken portion of the coil spring 4 is, for example, a broken portion of a fragment scattered when the coil spring 4 breaks, and a broken portion at a lower end of the upper coil spring 4 when the coil spring 4 breaks in a manner of being separated into upper and lower portions.

Further, the entire upper surface of the base portion 110 of the spring guide 100 and the entire upper surface of the side wall 111 are covered with the elastic portion 102, and thus, it is also possible to prevent damage to the main body portion 101 caused by a collision of such as a stepping stone whose collision position is difficult to predict.

The covering portion 103 is provided in a manner of covering the main body portion 101 over the entire anti-spring side of the main body portion 101. Specifically, the covering portion 103 covers the entire lower surface of the base portion 110 and the entire lower surface (outer side surface) of the side wall 111. Further, the covering portion 103 is provided on the entire outer surface of the plurality of ribs 114 along the shape of the ribs 114. That is, the covering portion 103 is provided on the anti-spring side (lower surface) of the main body portion 101 in a shape as if the shape of the anti-spring side of the main body portion 101 shown in FIG. 3 is transferred.

Here, generally, in a suspension device attached to a vehicle, a stepping stone may collide with a spring guide or water may adhere to the spring guide as the vehicle travels. In the spring guide, the anti-spring side, which is the lower surface side of the main body portion and faces the ground, is particularly prone to stepping stone collision and water adhesion. The spring guide may deteriorate or be damaged due to stepping stone collision or water adhesion, and the durability of the spring guide may decrease. In addition, when the spring guide is formed of a resin material, if water containing calcium chloride, which is contained in a snow melting agent or the like, adheres to the spring guide, the spring guide is particularly liable to deteriorate or be damaged.

On the other hand, in this embodiment, the anti-spring side of the main body portion 101 of the spring guide 100, which is prone to stepping stone collision and water adhesion, is covered with the covering portion 103. Therefore, the covering portion 103 mitigates the impact caused by stepping stone collision and suppresses water adhesion. Therefore, the durability of the spring guide 100 and therefore the suspension device 10 can be improved. Further, the thickness of the covering portion 103 can be arbitrarily formed as long as the desired durability is achieved, and the weight increase can be suppressed by making the thickness as thin as possible.

The covering portion 103 and the elastic portion 102 are integrally molded on the main body portion 101 by injection molding, respectively. Furthermore, the covering portion 103 and the elastic portion 102 are integrally formed with each other as shown in FIG. 4. Thereby, the covering portion 103 and the elastic portion 102 can be easily manufactured, and the manufacturing process is simplified, and thus, the cost can be reduced.

As a method for molding the covering portion 103 and the elastic portion 102, for example, the main body portion 101 is previously molded, and the main body portion 101 is provided with a hole for communicating the spring side and the anti-spring side. Then, with the main body portion 101 housed in the mold, the materials of the covering portion 103 and the elastic portion 102 are injected into the mold, and the materials of the covering portion 103 and the elastic portion 102 are injected on both the spring side and the anti-spring side through the hole of the main body portion 101. Thus, by injecting materials from one of the spring side and the anti-spring side of the main body portion 101 without changing the mold or changing the setup, the covering portion 103 and the elastic portion 102 can be simultaneously molded on both sides (the spring side and the anti-spring side) of the main body portion 101, respectively. Further, the molding method of the covering portion 103 and the elastic portion 102 is not limited to such a method, and may be other than injection molding.

In addition to the above-mentioned viewpoint of improving durability, it is preferable to select the material of the main body portion 101, the material of the covering portion 103, and the material of the elastic portion 102 in consideration of a material combination having a high bonding force between the material of the main body portion 101 and the materials of the covering portion 103 and the elastic portion 102.

Here, "materials having different physical properties" in this description will be explained. As manufacturing methods (molding methods) of resin molded body, various manufacturing methods such as extrusion molding are known in addition to the above-mentioned injection molding. Further, resin molded bodies may have different physical properties even if the resin molded bodies are made of the same material due to differences in the manufacturing methods. The expression "materials having different physical properties" in this description means including not only materials of different types of substances but also materials having different physical properties due to being manufactured by different manufacturing methods even if the materials are the same type of substance.

According to the above embodiment, the following actions and effects are exhibited.

In this embodiment, the anti-spring side of the main body portion 101 of the spring guide 100, which is prone to stepping stone collision and water adhesion, is covered with the covering portion 103, and thus, it is possible to suppress deterioration and damage of the main body portion 101 due to stepping stone collision and water adhesion. Therefore, the durability of the spring guide 100 and the suspension device 10 can be improved.

Further, in this embodiment, the elastic portion 102 is provided as a support portion on the spring side of the main body portion 101 including the upper surface of the base portion 110 on which the coil spring 4 is placed. Thereby, deterioration and damage due to stepping stone collision and water adhesion to the spring side of the main body portion 101 are suppressed.

Further, the covering portion 103 and the elastic portion 102 of the spring guide 100 are formed of the same material, specifically, the elastomer. Therefore, the cost can be reduced as compared with the case where the covering portion 103 and the elastic portion 102 are formed of different materials. Further, since the covering portion 103 and the elastic portion 102 are made of the same material, it is easy to perform simultaneous molding and integral molding of both, which facilitates manufacturing.

Further, in this embodiment, the covering portion 103 and the elastic portion 102 are formed of an elastomer having a lower elastic modulus than the resin material forming the main body portion 101, and thus, the spring guide 100 can be effectively protected particularly from the impact of collisions such as stepping stone collision. Further, since the elastic portion 102 is formed of the elastomer, the load input from the coil spring 4 to the spring guide 100 can be absorbed by the elastic portion 102.

Next, modifications of this embodiment will be described.

First, a modification of the covering portion 103 shown in FIGS. 5 and 6 will be described.

As described above, the ribs 114 on the lower surface of the main body portion 101 reinforce the main body portion 101 and improve the durability of the main body portion 101. On the other hand, an impact applied to the ribs 114 from the side surfaces 114a and 114b (see FIG. 3) thereof due to stepping stones or the like may damage the ribs 114 and decrease the durability of the main body portion 101.

In the above embodiment, the covering portion 103 is provided along the shape of the anti-spring side of the main body portion 101 including the ribs 114. In the above embodiment, the covering portion 103 also covers the side surfaces 114a and 114b of the ribs 114, and thus can mitigate the impact of the ribs 114 on the side surfaces 114a and 114b and improve the durability of the ribs 114 and, by extension, the main body portion 101.

Figure 5:
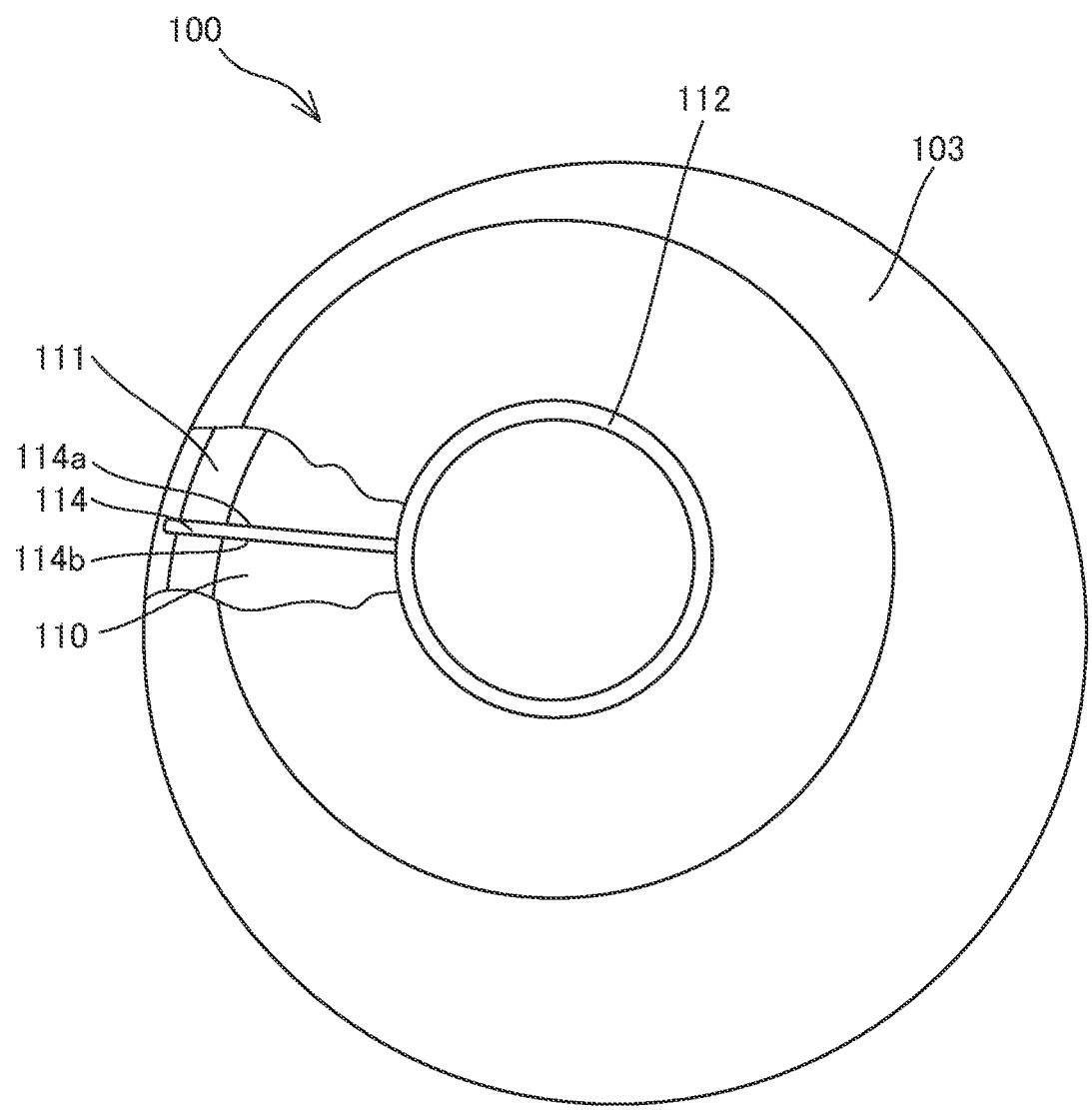
FIG. 5 is a plan view of a spring guide according to a modification of the embodiment of the present invention as viewed from the lower surface side.
Figure 6:
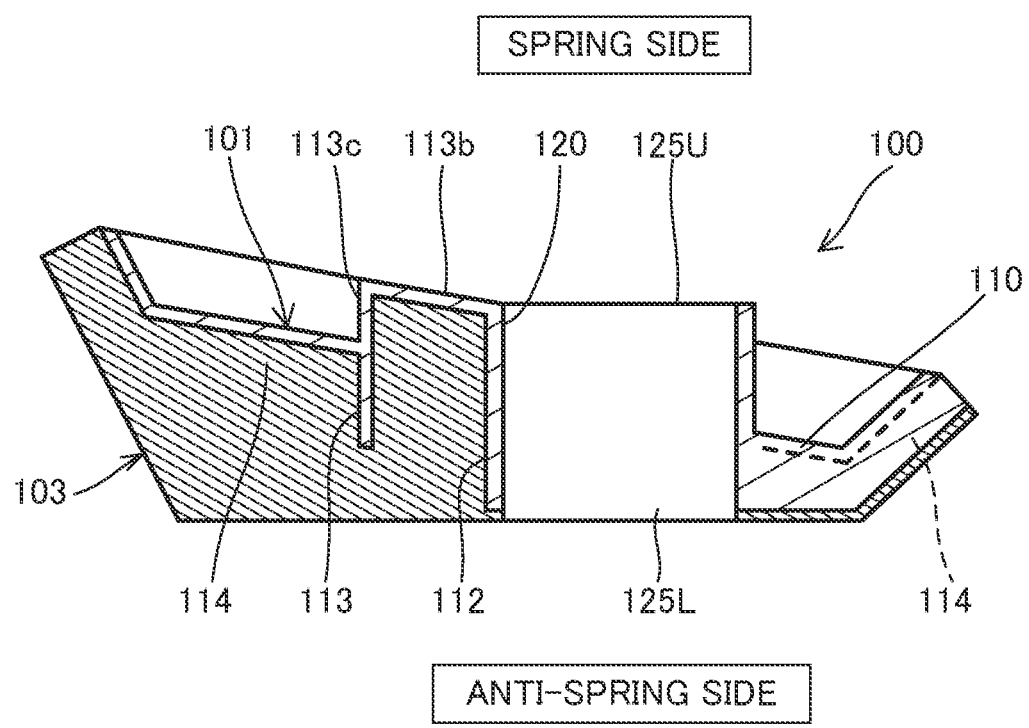
FIG. 6 is a cross-sectional view corresponding to FIG. 4, and is a cross-sectional view of a spring guide according to a modification of the embodiment of the present invention.

On the other hand, in the modification shown in FIGS. 5 and 6, the covering portion 103 does not follow the shape of the anti-spring side of the main body portion 101. In this modification, the ribs 114 are embedded in the covering portion 103, which is formed in a substantially conical trapezoidal shape (see FIG. 6). That is, by being covered with the covering portion 103 in a manner that the ribs 114 are embedded, the shape of the ribs 114 is not exposed and the outer shape of the ribs 114 is not visible from the outside (see FIG. 5). This suppresses the impact of the ribs 114 on the side surfaces 114a and 114b due to stepping stones and the like, and thus further improves the durability as compared with the above embodiment. Further, the shape of the covering portion 103 in this modification is not limited to a substantially conical trapezoidal shape, and any structure in which the plurality of the ribs 114 is embedded has the same effect as this modification.

Next, other modifications will be described.

The above embodiment describes the spring guide 100 in which the side wall 111 extends diagonally upward from a radial outer end portion of the base portion 110, but the present invention is not limited thereto. The side wall 111 can be omitted.

Further, in the above embodiment, the covering portion 103 is the thermoplastic elastomer having physical properties different from those of the resin material of the main body portion 101. On the other hand, the covering portion 103 may be formed of any other material as long as the physical properties thereof are different from those of the resin material of the main body portion 101. For example, a thermosetting elastomer such as urethane rubber, silicone rubber, or fluororubber may be adopted for the material of the covering portion 103. Further, the material of the covering portion 103 is not limited to the elastomer, and other materials may be adopted. Specifically, for the covering portion 103, a resin material having a lower water absorption rate than the material of the main body portion 101 (for example, polyethylene, polycarbonate, polypropylene, etc.) may be adopted. Further, the covering portion 103 may be a waterproof coating material applied to the main body portion 101 by a known method such as spraying. By adopting waterproof coating material for the covering portion 103, it is possible to reduce the weight of the spring guide 100 while suppressing deterioration and damage of the main body portion 101 due to water adhesion in particular. Further, the covering portion 103 may be a layer of metal plating applied to the main body portion 101. Environmental deterioration can be suppressed by adopting metal plating for the covering portion 103.

Further, the covering portion 103 may have a higher elastic modulus than the main body portion 101. Because the covering portion 103 can absorb impacts without cracking, etc. when the elastic modulus thereof is smaller than that of the main body portion 101, the covering portion 103 is effective in protecting the main body portion 101, but it is possible to protect the main body portion 101 from impacts even if the covering portion 103 has a higher elastic modulus than the main body portion 101.

Further, in the above embodiment, the covering portion 103 and the elastic portion 102 are made of the same material, but the covering portion 103 may be made of a material different from that of the elastic portion 102. Similar to the covering portion 103, a thermosetting elastomer such as urethane rubber, silicone rubber, or fluororubber may be adopted for the elastic portion 102. Further, the elastic portion 102 is not limited to the elastomer, and other resin materials may be adopted. Further, a coating material or metal plating may be adopted for the support portion. Further, the covering portion 103 and the elastic portion 102 may be formed separately from each other and the covering portion 103 may be made of a material different from that of the elastic portion 102.

Figure 7:
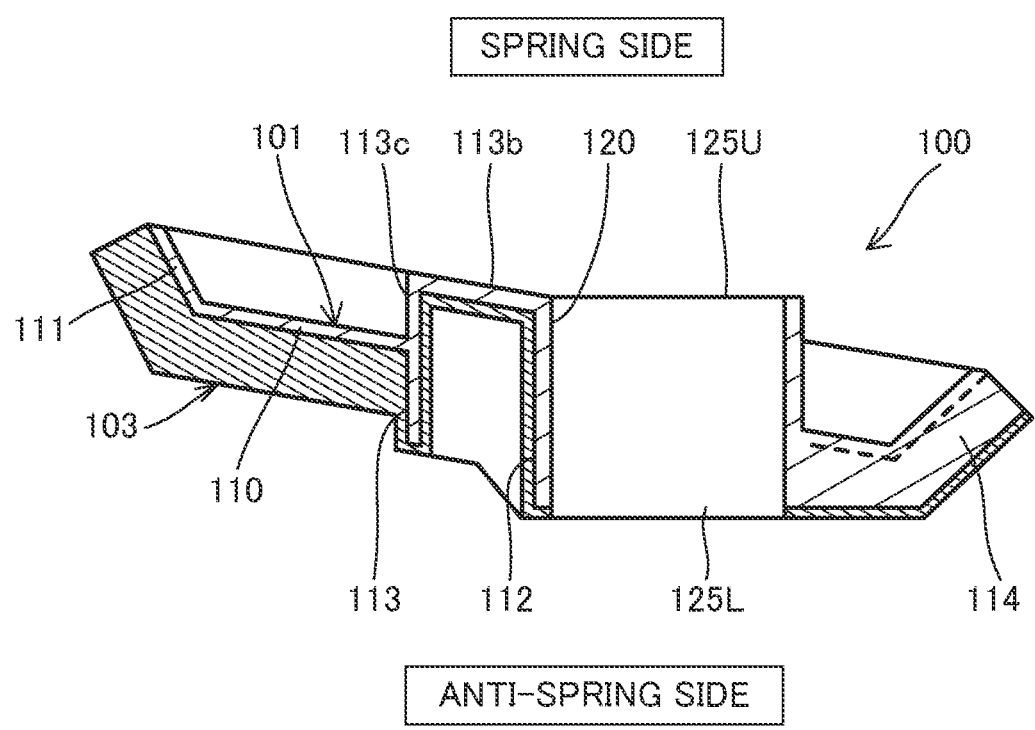
FIG. 7 is a cross-sectional view corresponding to FIG. 4, and is a cross-sectional view of a spring guide according to another modification of the embodiment of the present invention.

Further, in the above embodiment, the elastic portion 102 is provided as a support portion on the spring side of the main body portion 101. On the other hand, the support portion (the elastic portion 102) is not a essential configuration. As shown in FIG. 7, the configuration may be such that the support portion is not provided on the spring side of the main body portion 101 and only the covering portion 103 is provided on the anti-spring side. Further, by forming a locking portion with a resin layer which covers at least the upper surface of the side wall 111 and is continuous (formed integrally) with the covering portion 103, the covering portion 103 and the locking portion are caught on the side wall 111, and thereby suppress the peeling of the covering portion 103 from the main body portion 101. Further, by providing the locking portion that covers at least the upper surface and the inner surface of the side wall 111 (that is, the entire side wall 111), it is possible to suppress the decrease in the strength of the side wall due to disturbance, and thereby reduce the possibility that the coil spring 4 collides with the vehicle body when the coil spring 4 breaks. On the contrary, a resin layer (the covering portion 103 and the elastic portion 102) may be provided on the entire periphery of the spring guide 100 except the inner periphery of the insertion hole 120. This allows the entire surface of the spring guide 100 to be protected from stepping stones and water, and also allows the spring guide 100 to be press-fitted into the cylinder 1b, making it easier to mount.

Further, in the above embodiment, a single-layered covering portion 103 is provided. On the other hand, the main body portion 101 may be provided with the covering portion 103 having two or more layers (multiple layers). In this case, the materials of the plurality of layers may partially or wholly coincide with each other, or may be different from each other.

Further, in the above embodiment, the covering portion 103 is provided over the entire anti-spring side of the main body portion 101. On the other hand, the covering portion 103 may be provided on a part of the anti-spring side of the main body portion 101. To protect the main body portion 101, it is desirable to provide the covering portion 103 over the entire anti-spring side of the main body portion 101, and if the covering portion 103 is provided at least in part, the covering portion 103 can exert the effect of protecting the main body portion 101 from stepping stones.

Further, the resin layer (the elastic portion 102, the covering portion 103) provided on the surface of the spring guide 100 is formed of the same material as the dust boot 7, and may be integrally formed with the dust boot 7. In this case, the manufacturing cost of the suspension device 10 can be reduced.

Hereinafter, the configurations, actions, and effects of the embodiment of the present invention will be collectively described.

The spring guide 100 includes: the main body portion 101 of which the coil spring 4 placed on the vehicle body side, the main body portion 101 being formed of a resin material; and the covering portion 103 that covers the anti-spring side opposite to the coil spring 4 in the main body portion 101, wherein the covering portion 103 is formed by a material having physical properties different from those of the resin material forming the main body portion 101.

In this configuration, the covering portion 103 provided on the anti-spring side of the spring guide 100 prevents stepping stone collision from the ground and water adhesion to the spring guide 100. This improves the durability of the spring guide 100.

In addition, the spring guide 100 further includes the elastic portion 102 that is formed of a material having physical properties different from those of the resin material forming the main body portion 101 and is integrally molded with the main body portion 101 between the main body portion 101 and the end portion of the coil spring 4.

This configuration prevents stepping stone collision and water adhesion to the spring side of the spring guide 100, which is the most loaded region that supports the weight of the vehicle body. Therefore, the durability of the spring guide 100 can be further improved.

Further, in the spring guide 100, the covering portion 103 and the elastic portion 102 are formed of the same material.

In this configuration, since the covering portion 103 and the elastic portion 102 are made of the same material, it is easier to reduce the cost as compared with the case where the covering portion 103 is made of a material different from that of the elastic portion 102. In addition, simultaneous molding or integral molding of the covering portion 103 and the support portion can be easily performed, and the manufacturing becomes easy.

Further, in the spring guide 100, the covering portion 103 and the elastic portion 102 are formed of an elastomer having a lower elastic modulus than the resin material forming the main body portion 101.

In this configuration, the spring guide 100 can be protected particularly from the impact of collisions such as stepping stone collision. Further, since the elastic portion 102 is formed of the elastomer, the load input from the coil spring 4 to the spring guide 100 can be absorbed by the support portion.

Further, in the spring guide 100 according to the modification, the ribs 114 are provided on the anti-spring side of the main body portion 101, and the covering portion 103 covers the anti-spring side of the main body portion 101 in a manner of embedding the ribs 114.

In this configuration, the ribs 114 can reinforce the main body portion 101 and improve the durability of the main body portion 101. Further, since the ribs 114 are embedded in the covering portion 103, the collision of stepping stones and the like with the ribs 114 can be suppressed, and the deterioration of durability due to the damage of the ribs 114 can be suppressed.

Further, the suspension device 10 includes: the spring guide 100; the shock absorber 1; the upper mount 2 attached to the tip end of the rod 1a of the shock absorber 1; the coil spring 4 provided between the spring guide 100 and the upper mount 2; and the metal support ring 3 that is fixed to the cylinder 1b of the shock absorber 1 and supports the spring guide 100.

In this configuration, the covering portion 103 prevents stepping stone collision from the ground and water adhesion to the spring guide 100. This improves the durability of the suspension device 10.

Although the embodiments of the present invention have been described in the above, the above-mentioned embodiment merely illustrates a part of application examples of the present invention, and the technical scope of the present invention is not intended to be limited to the specific configurations of the above-described embodiment.

The present application claims a priority based on Japanese Patent Application No. 2020-20839 filed on Feb. 10, 2020 in the Japan Patent Office, the entire contents of which are incorporated herein by reference.

The invention claimed is:

1. A spring guide that is attached to a shock absorber provided between a vehicle body and a wheel, and supports the vehicle body via a coil spring, the spring guide comprising:

a main body portion on which the coil spring is placed, the main body portion being formed of a resin material, the main body portion being configured to support the vehicle body via the coil spring;

a covering portion that covers an anti-spring side of the main body portion opposite to a spring side of the main body portion where the coil spring is placed; and a support portion that is integrally molded with the main body portion between the main body portion and an end portion of the coil spring, the support portion covering an entire region of the spring side of the main body portion, wherein the covering portion is formed of a material having a physical property different from that of the resin material forming the main body portion.

2. The spring guide according to claim 1, wherein the spring guide is attached in contact with the shock absorber.

3. The spring guide according to claim 2, wherein the covering portion and the support portion are formed of the same material.

4. The spring guide according to claim 1, wherein the covering portion is exposed at a side thereof opposite to a side thereof that covers the main body portion.

5. The spring guide according to claim 4, wherein the covering portion and the support portion are formed of an elastomer having an elastic modulus different from that of the resin material forming the main body portion.

6. The spring guide according to claim 1, wherein:

the support portion is formed of a material having a physical property different from that of the resin material forming the main body portion.

7. The spring guide according to claim 1, wherein a rib is provided on the anti-spring side of the main body portion; and the covering portion covers the anti-spring side of the main body portion in a manner of embedding the rib.

8. A suspension device, comprising:

the spring guide according to claim 1;

the shock absorber;

an upper mount attached to a tip end of a rod of the shock absorber;

the coil spring provided between the spring guide and the upper mount; and a metal support member that is fixed to a cylinder of the shock absorber and supports the spring guide.

9. The spring guide according to claim 1, wherein the main body portion is configured to be directly attached to a cylinder of the shock absorber to support the vehicle body via the coil spring.

* * * * *